United States Patent
Raman et al.

(10) Patent No.: US 9,332,240 B1
(45) Date of Patent: May 3, 2016

(54) METHODS, DEVICES, AND MEDIUMS ASSOCIATED WITH CONTROLLING MEDIA CONTENT DELIVERY TO A REMOTE DEVICE

(71) Applicant: INTELLECTUAL VENTURES FUND 79 LLC, Las Vegas, NV (US)

(72) Inventors: Lakshmi G. Raman, Bellevue, WA (US); Lawrence E. Lycke, Seattle, WA (US)

(73) Assignee: INTELLECTUAL VENTURES FUND 79 LLC, Las Vegas, NV (US)

( * ) Notice: Subject to any disclaimer, the term of this patent is extended or adjusted under 35 U.S.C. 154(b) by 395 days.

(21) Appl. No.: 13/762,722

(22) Filed: Feb. 8, 2013

(51) Int. Cl.
 *H04N 5/76* (2006.01)
 *H04N 9/79* (2006.01)

(52) U.S. Cl.
 CPC ...................... *H04N 9/79* (2013.01)

(58) Field of Classification Search
 USPC .......................... 386/291, 296–299
 See application file for complete search history.

(56) References Cited

U.S. PATENT DOCUMENTS

| | | | |
|---|---|---|---|
| 8,910,218 B2 * | 12/2014 | Tirasirikul et al. | 725/78 |
| 8,924,999 B1 * | 12/2014 | Santangelo et al. | 725/25 |
| 2004/0162780 A1 | 8/2004 | Booth | |
| 2007/0079340 A1 * | 4/2007 | McEnroe | 725/78 |
| 2008/0059409 A1 | 3/2008 | Montpetit | |
| 2008/0163286 A1 * | 7/2008 | Rudolph | H04N 21/422 725/28 |
| 2009/0133089 A1 | 5/2009 | Ku et al. | |
| 2010/0263011 A1 * | 10/2010 | McMurtrie | 725/110 |
| 2012/0179786 A1 | 7/2012 | Nandagopal | |

* cited by examiner

*Primary Examiner* — Nigar Chowdhury
(74) *Attorney, Agent, or Firm* — Schwabe, Williamson & Wyatt

(57) ABSTRACT

A method, device, and/or medium may be associated with controlling media content delivery to a remote device by generating and transmitting a request to schedule media content for recording. An identification of a remote device that is prohibited from accessing the scheduled media content may be generated and included in the request. A request to transmit the recorded media content may be denied based, at least in part, on the identification of the prohibited device.

26 Claims, 7 Drawing Sheets

METHODS, DEVICES, AND MEDIUMS ASSOCIATED WITH CONTROLLING MEDIA CONTENT DELIVERY TO A REMOTE DEVICE

BACKGROUND

In order to assist parents in controlling the types of programs that their children may be permitted to watch, television sets equipped with what is referred to as a "V-Chip" may feature the ability to block the display of television programs based upon a rating established by a number of media associations, including the National Association of Broadcasters, the National Cable Television Association, and the Motion Picture Association of America. The V-Chip identifies the rating encoded in the television program and may block the ability of the television set to display the television program based upon parental control settings.

A recording device may be programmed to restrict what television programs may be recorded based on the parental control settings. Known media streaming devices may be configured to transmit the recorded television program to a wireless device for playback. The recording of the television programs may be restricted according to one or more of the following designated rating content: TV-Y (all children), TV-Y7 (older children), TV-G (general audience), TV-PG (parental guidance suggested), TV-14 (parents strongly cautioned), and TV-MA (mature audience only). Nevertheless, the known media streaming devices may transmit the recorded television program to a wireless device of a user for which the content of the recorded television program may not be appropriate.

DETAILED DESCRIPTION

Network media providers may offer their customers the ability to add a digital recording device, or DVR, in order to schedule the recording of television programs, videos, movies, sports, other types of media content, or any combination thereof. For, example, the television programs may be recorded according to a specific time and date, or for any instance of a particular television program being broadcast. The DVR may be configured to provide the customers with the ability to view the television program at their convenience, at any time, and even in interrupted sessions allowing them to pause the recorded program before the recorded program has finished. Similarly, the DVR may be configured to provide the customers with the ability to fast forward through, and/or omit, commercials and/or other types of advertisements.

A wireless router and/or media streaming device may be operatively coupled to the DVR to allow the transmission of the recorded program to a wireless device. The wireless device may comprise any device configured to receive transmissions from the media streaming device. Customers may have multiple wireless devices, including a smart phone, personal computer, tablet, other remote devices, or any combination thereof.

Different members of the customer's household may each have one or more wireless devices that may be primarily, and/or exclusively, used by each of the different members. Although a customer may desire to have the ability to stream any recorded television program to their own wireless device, some customers may want the ability to restrict the types of recorded television programs which may be streamed to other wireless devices, such as their children's wireless devices.

Figure 1:
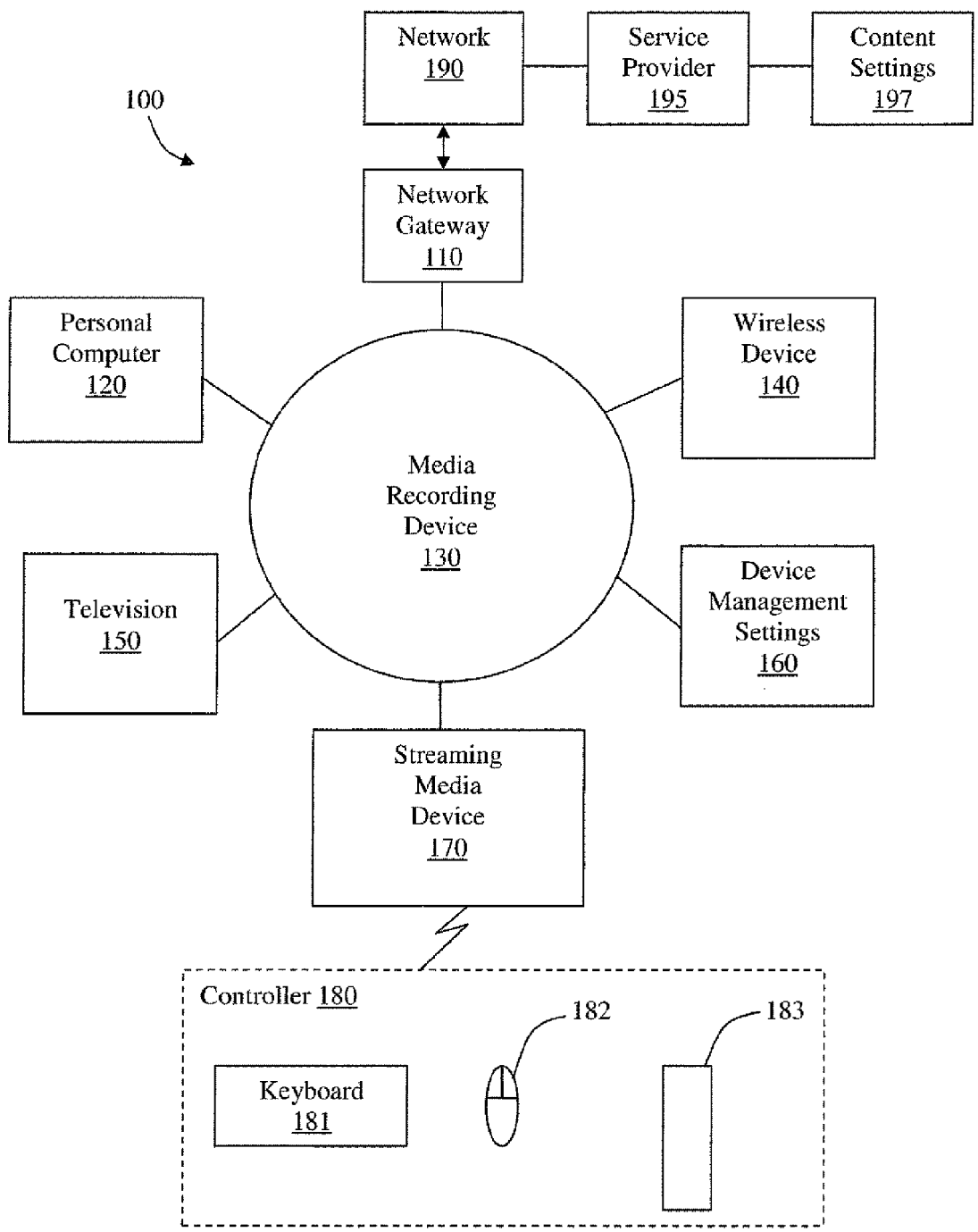
FIG. 1 depicts a block diagram of an example of a system configured to deliver media content to a remote device.

FIG. 1 depicts a block diagram of an example of a system 100 configured to deliver media content to a remote device. A media recording device 130 may be operatively coupled to a service provider 195, such as a cable network media provider, a dish network media provider, a Wi-Fi network media provider, a cellular network media provider, or other types of media content providers, via a network gateway 110. Network gateway 110 may comprise a router, a wireless router, a gateway, a modem, or any combination thereof, which may be configured to connect media recording device 130 to service provider 195 over a network 190.

Network 190 may comprise a public network or a private network established for personal use, business use, governmental use, or any combination thereof. For example, network 190 may comprise a cable network, a satellite network, a cellular network, a telephone network, a broadband network, a voice over Internet protocol (VoIP) network, or any combination thereof. Furthermore, network 190 may comprise a wired network, a wireless network, a local area network, a wide area network, the Internet, a virtual network, or any combination thereof.

Media recording device 130 may comprise, or be operatively coupled with, a streaming media device 170. The media recording device 130 and/or streaming media device 170 may be configured to communicate with one or more remote devices, such as a personal computer 120, a wireless device 140, a controller 180, other types of remote devices, or any combination thereof.

Streaming media device 170 may comprise, or be operatively coupled with, a wireless router. The media recording device 130 and/or the streaming media device 170 may be associated with one or more network users, customers, or subscribers of a service associated with service provider 195. For example, service provider 195 may provide services associated with media content delivery including television programming, pay-per-view events, music, Internet access, telephone usage, other types of media, or any combination thereof.

Media recording device 130 may comprise a processor configured to execute stored instructions. Additionally, media recording device 130 may be configured to access device management settings 160 to manage the recording and/or delivery of media content to one or more electronic devices. Media recording device 130 may comprise a storage medium configured to store device management settings 160. In some examples, media recording device 130 may be used by different users, and each user may be associated with one or more user accounts which provide the users with access to device management settings 160. Different settings may be stored for each user account.

Controller 180 may be configured to manage and/or control an operation of media recording device 130. For example, controller 180 may be configured to manipulate a user interface displayed on a television 150, in order to schedule the recording of a television program by media recording device 130. Additionally, or in the alternative, controller 180 may comprise a screen which may be configured to display a user interface that may be used to schedule the recording of the television program by media recording device 130.

Controller 180 may comprise a personal computer, a smart-phone, a tablet, a hand-held device, other types of controllers, or any combination thereof. In some examples, controller 180 may comprise a keyboard 181, a mouse 182, and/or a television remote control 183. In addition to being used to control and/or manage the recording of media content by media recording device 130, controller 180 may be configured to manage the delivery of media content to a remote device, such as personal computer 120, wireless device 140, television 150, controller 180 itself, other remote devices, or any combination thereof.

Device management settings 160 may comprise a listing of devices and associated access rights, including access rights for wireless personal computer 120, wireless device 140, television 150, streaming media device 170, other types of electronic devices, or any combination thereof. Additionally, wireless device 140 may comprise a laptop computer, a television, a smart-phone, a tablet, a hand-held device, other types of remote devices, or any combination thereof.

System 100 may be configured to manage, update, access, transmit, and/or receive a listing of wireless devices and access rights associated with the wireless devices stored in device management settings 160. In some examples, controller 180 may access, view, and/or receive a copy of device management settings 160 from media recording device 130.

Controller 180 may be configured to generate a request to schedule media content for recording. Additionally, controller 180 may be configured to identify, from the listing of wireless devices, a wireless device that is prohibited from accessing, viewing, and/or receiving the recorded media content based, at least in part, on the associated access rights. For example, controller 180 may be configured to identify and/or designate that wireless device 140 is prohibited from accessing, viewing, and/or receiving the recorded media content. In some examples, controller 180 may be configured to revise the listing of wireless devices by changing the listed wireless devices and/or modifying associated access rights. The access rights may be separately assigned to each of the wireless devices identified in the listing of wireless devices.

The request to schedule media content may be transmitted from controller 180 to media recording device 130. The request may include an identification of the prohibited wireless device along with the designation of the media content that is being scheduled for recording. In some examples, the controller 180 may be configured to transmit the revised listing of wireless devices back to media recording device 130. Media recording device 130 may be configured to harmonize and/or integrate device management settings 160 with the revised listing of wireless devices provided by controller 180.

The listing of wireless devices stored in device management settings 160 may identify one or more wireless devices that may be authorized to access, view, and/or receive the scheduled media content. In some examples, the listing of wireless devices may be configured to identify one or more wireless devices that are prohibited from accessing, viewing, and/or receiving the scheduled media content. Additionally, the access rights associated with the listing of wireless devices may be associated with a plurality of services. The prohibited wireless device may be identified based, at least in part, on which of the plurality of services the scheduled media content is associated with. One or more of the wireless devices may be identified as being prohibited from accessing, viewing, and/or receiving media content associated with a particular service.

Media recording device 130 may be configured to receive a request to transmit the media content to the prohibited wireless device after the media content is recorded, and/or to deny the request to transmit the media content to the prohibited wireless device in response to receiving the request to transmit. Wireless device 140 may be identified as being prohibited from accessing, viewing, and/or receiving the recorded media content, before the scheduled media content is recorded.

Wireless device 140 may comprise a storage medium configured to store device management settings 160. In some examples, wireless device 140 may be used by different users, and each user may be associated with one or more user accounts which provide the users with access to device management settings 160. Different settings may be stored for each user account.

Additionally, media recording device 130 may be configured to receive a request to transmit the recorded media content to an authorized wireless device. The authorized wireless device may be identified from the listing of wireless devices based, at least in part, on the associated access rights. For example, wireless device 140 may explicitly be identified in the listing of wireless devices as being authorized to receive the recorded media content. In other examples, wireless device 140 may be implicitly authorized to receive the media content if it is not identified as being a prohibited wireless device. Upon identifying an authorized wireless device, media recording device 130 may be configured to transmit the recorded media content to the authorized wireless device in response to receiving the request to transmit. In some examples, the recorded media may be streamed to the authorized wireless device by streaming media device 170.

Wireless device 140 may be configured to access, view and/or receive a copy of the listing of wireless devices stored in device management settings 160. In some examples, wireless device 140 may perform some or all of the operations described above with respect to media recording device and/or controller 180. In response to a user requesting to download media content to wireless device 140, wireless device 140 may be configured to first consult the listing of wireless devices to determine whether it is prohibited from doing so, and in response to determining that it is prohibited from doing so, to notify the user that the device is not authorized to stream the requested media. In some examples, although wireless device 140 may access, view, and/or receive a copy of the listing of wireless devices, it may be prohibited from making any changes to the listed wireless devices and/or to the associated access rights.

Wireless device 140 may be configured to store the listing of wireless devices, such that the listing of wireless devices may be ported from one media content delivery system to another media content delivery system. For example, a wireless device associated with a first media content delivery system may be identified as being a prohibited device for purposes of accessing, viewing, and/or receiving prohibited media content, such as pay-per-view events. For example, when the customer's child takes wireless device 140 to a friend's house; the listing of prohibited devices may be ported to a second media content delivery system.

Wireless device 140 may be configured to self-regulate its own access to the prohibited media content. For example, the wireless device 140 may generate a message to the user that the device is not authorized to order a pay-per-view event. In some examples, wireless device 140 may share the listing of prohibited devices, or a portion thereof, with the second media content delivery system. The second media content delivery system may be configured to identify wireless device 140 as being a prohibited device based on the listing of prohibited devices stored on wireless device 140, and may refuse a request from wireless device 140 to receive the prohibited media content.

Service provider 195 may manage and/or maintain content delivery control settings 197 of media provided to personal computer 120, wireless device 140, television 150, and/or streaming media device 170. For example content delivery control settings 197 may comprise a parental control setting for viewing cable TV content on television 150. Controller 180 may be configured to revise content delivery control settings 197. Additionally, content delivery control settings 197 may be stored on a set-top box located at a customer's premises. In some examples, content delivery control settings 197 may be stored remotely, such as on a server associated with service provider 195.

Media recording device 130 may be controlled by, owned by, and/or otherwise associated with, service provider 195. Alternatively, media recording device 130 may be controlled by, owned by, and/or associated with a second service provider. Different service providers may be associated with different content delivery control settings and/or different parental control settings.

Controller 180 may be configured to revise one or both of content delivery control settings 197 and device management settings 160. Controller 180 may be configured to propagate, harmonize, and/or integrate updates from content delivery control settings 197 to device management settings 160, and/or vice versa. In some examples, controller 180 may be configured to retrieve settings from one system and use the settings as a default for both systems. Conflicting media access settings may be identified so that the user can resolve any conflicts for one or more devices.

Content delivery control settings 197 may be used in addition to, or instead of, device management settings 160. In some examples, the content and functionality described above with respect to device management settings 160 may instead be provided by content delivery control settings 197. For example, a listing of devices and associated access rights may be stored as content delivery control settings 197, as a service provided by service provider 195. Additionally, the listing of devices and associated access rights may be stored together with parental control settings as part of content delivery control settings 197.

Figure 2:
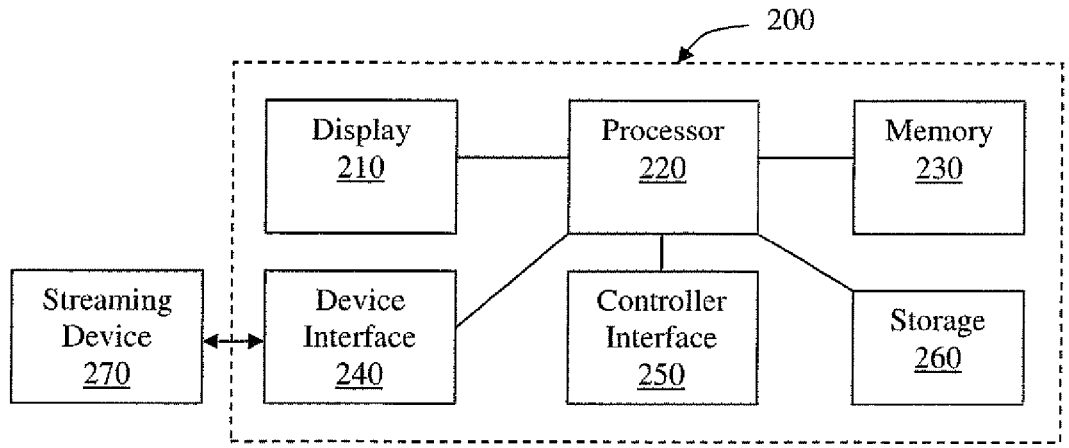
FIG. 2 depicts an example of an apparatus configured to communicate with a streaming media device.

FIG. 2 depicts an example of an apparatus 200 configured to communicate with a streaming media device 270. Apparatus 200 may comprise a processing device 220 operatively coupled to a display 210, a memory device 230, a device interface 240, a controller interface 250, and a storage device 260. Device interface 240 may comprise electronic circuits or programs configured to interface and/or communicate with streaming media device 270, a media recording device, a service provider, or any combination thereof.

Memory device 230 may be configured to store instructions associated with an application program. Processing device 220 may be configured to execute the instructions stored in memory device 230. Storage device 260 may be configured to store a listing of wireless devices and associated access rights for accessing, viewing, and/or receiving recorded media content. In some examples, storage device 260 may comprise device management settings including the listing of wireless devices and associated access rights.

Processing device 220 may be configured to generate a request to schedule media content for recording. The request may be transmitted to streaming media device 270 via device interface 240. Additionally, the request may identify a wireless device that is prohibited from accessing, viewing, and/or receiving the scheduled media content after it has been recorded.

Controller interface 250 may be configured to receive instructions for designating an identification of the wireless device that is prohibited from accessing, viewing, and/or receiving the scheduled media content. Controller interface 250 may comprise one or more controls or input devices that enable a user to access, view, and/or modify the listing of wireless devices. In some examples, controller interface 250 may provide an interface between apparatus 200 and a separate controller device. Additionally, display 210 may be configured to enable a user to access, view, and/or modify the listing of wireless devices.

Device interface 240 may be configured to receive a listing of wireless devices from streaming media device 270. Processing device 220 may be configured to harmonize and/or integrate the listing of wireless devices received from streaming media device 270 with the information maintained in storage device 260. Streaming media device 270 may comprise, or be operatively coupled with, a wireless router and/or a media content recorder.

The listing of wireless devices may identify and/or designate one or more wireless devices that are prohibited from accessing, viewing, and/or receiving the scheduled media content. The prohibited wireless device may be designated prior to the scheduled media content being recorded. In some examples, the identification of the prohibited wireless devices may be designated while generating the request to schedule the recording of the media content.

The listing of wireless devices may be shared between a plurality of devices associated with a media content delivery system. For example, a first device may be configured to download a copy of the listing of wireless devices from a media content delivery system. The first device may modify and/or update the listing of wireless devices. Additionally, the first device may be configured to transmit the modified listing of wireless devices back to the media content delivery system. The media content delivery system may be configured to transmit the modified listing of wireless devices to one or more of the plurality of devices.

The request to schedule media content may comprise a parental control setting associated with the scheduled media content. The designated wireless device may be prohibited from accessing, viewing, and/or receiving the scheduled media content associated with the parental control setting.

The designated access rights for the wireless device may comprise an assigned viewing permission setting associated with a selected program of the scheduled media content.

Access to the media content by the prohibited wireless device may be restricted to the selected program based, at least in part, on the assigned viewing permission setting. In some examples, the designated access rights may comprise an assigned viewing permission setting associated with a selected channel of the scheduled media content. Similarly, access to the media content by the prohibited wireless device may be restricted to the selected channel based, at least in part, on the assigned viewing permission setting.

The listing of wireless devices may identify a plurality of services associated with different media content. Additionally, the listing of wireless devices may identify which of the plurality of services the wireless device may be prohibited from accessing, viewing, and/or receiving. For example, the wireless device may be authorized to access Internet services, but may be prohibited from accessing television services, such as the streaming of television programming.

The user of a wireless device may be prompted with a request to enter a password and/or username. For example, the password may provide an authorized device with a secondary layer of restricted access to the recorded media content in the event that the wireless device is being operated by an unauthorized user. In some examples, the password may provide the user with the ability to override the restricted access to the recorded media content in the event that a prohibited device is being operated by a system administrator and/or by an authorized user. Recorded media content may be stored and/or transmitted in encrypted form. Successful entry of the correct password may operate to decrypt the recorded media content for subsequent viewing on the wireless device. Other methods and/or systems for authenticating, verifying, and/or detecting a user may include biometric analysis of voice recognition, fingerprints, and retinal scans, other types of authentication techniques, or any combination thereof.

Figure 3:
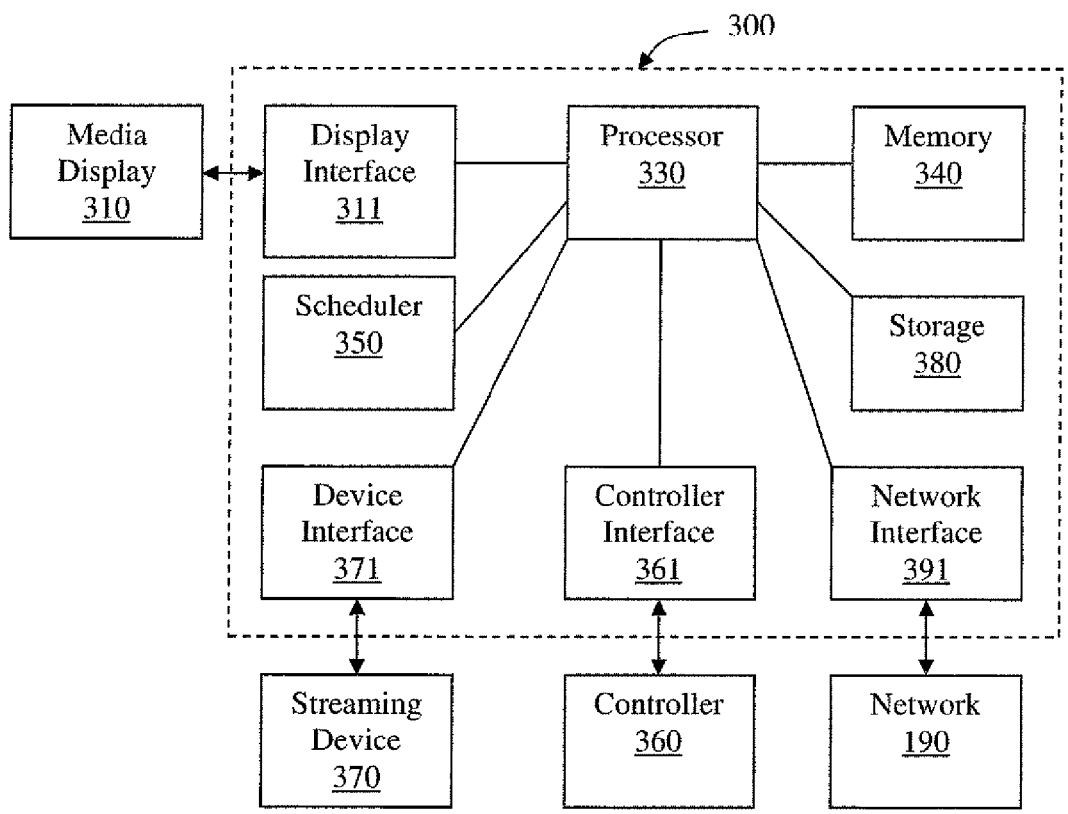
FIG. 3 depicts an example of an apparatus configured to deliver media content.

FIG. 3 depicts an example of an apparatus 300 configured to deliver media content. Apparatus 300 may comprise a processing device 330 operatively coupled to a display interface 311, a memory 340, a user display 350, a controller interface 361, a device interface 371, a storage device 380, and/or a network interface 391. In some examples, apparatus 300 may comprise, or be operatively coupled with, a DVR, a set-top box, a television, a computer, a server, other devices configured to deliver media content, or any combination thereof.

Display interface 311 may comprise electronic circuits or programs configured to interface and/or communicate with a media display 310. Media display 310 may comprise a computer, a television, a monitor, a smart-phone, a plasma screen, a LCD screen, a projection screen, other types of display devices, or any combination thereof. Media display 310 may be configured to display media content and/or to provide a user interface for making user selections or providing instructions to apparatus 300.

Memory device 340 may be configured to store instructions associated with an application program. Processing device 330 may be configured to execute the instructions stored in memory device 340. Additionally, memory device 340 may be configured to store a listing of wireless devices and associated access rights for accessing, viewing, and/or receiving recorded media content. In some examples, memory device 340 may comprise a look-up table (LUT) including a listing of wireless devices and associated media content access rights. Storage device 380 may be configured to store media content, for example recorded television programs that have previously been scheduled. Processing device 330 may be configured to retrieve the media content stored in storage device 380.

Scheduler 350 may be configured to manage, schedule, and/or otherwise coordinate the recording of media. For example, a controller 360 may be used to schedule the recording of media content on storage device 380, using scheduler 350.

Controller interface 361 may comprise electronic circuits or programs configured to interface and/or communicate with controller 360. Controller interface 361 may be configured to receive instructions for designating an identification of a wireless device that is prohibited from accessing, viewing, and/or receiving the scheduled media content. Controller 360 may comprise a personal computer, a smart-phone, a tablet, a hand-held device, a keyboard, a mouse, a television remote control, other types of controllers, or any combination thereof. Controller 360 may comprise one or more controls or input devices that enable a user to access, view, and/or modify the listing of wireless devices.

Device interface 371 may comprise electronic circuits or programs configured to interface and/or communicate with a streaming media device 370. Streaming media device 370 may comprise, or be operatively coupled with, a wireless router. In some examples, apparatus 300 may be configured to communicate with and/or transmit information to, or from, one or more wireless devices via streaming media device 370.

Device interface 371 may be configured to receive a listing of wireless devices from streaming media device 370. Processing device 330 may be configured to harmonize and/or integrate the listing of wireless devices received from streaming media device 370 with the information maintained in memory device 340.

Network interface 391 may comprise a router, a gateway, a modem, or any combination thereof, which may be configured to connect apparatus 300 to one or more network devices, systems, and/or service providers over network 190.

Processing device 330 may be configured to receive a request to schedule media content for recording from a first wireless device. The request may identify a wireless device that is prohibited from accessing, viewing, and/or receiving the scheduled media content. The scheduled media content may be recorded in storage device 380 in response to receiving the request. In some examples, the request may identify a second wireless device that is authorized for, or prohibited from, accessing, viewing, and/or receiving the scheduled media content.

The request to transmit the recorded media content to the prohibited wireless device may be received from media display 310, from streaming media device 370, from controller 360, from a device operatively coupled to network 190, from a wireless device, or any combination thereof. The request to transmit the media content to the prohibited wireless device may be received after the media content is recorded. In some examples, apparatus 300 may be configured to deny the request to transmit the recorded media content to the prohibited wireless device in response to receiving the request to transmit.

Apparatus 300 may be configured to receive a request to transmit the recorded media content to an authorized wireless device. Additionally, apparatus 300 may be configured to transmit the recorded media content to the authorized wireless device in response to receiving the request to transmit. In some examples, a wireless device may be identified as being an authorized wireless device before the scheduled media content is recorded.

Apparatus 300 may be configured to maintain the listing of wireless devices and associated access rights in memory device 340. Additionally, apparatus 300 may be configured to update, in response to receiving the request to schedule media content for recording, the associated access rights for a prohibited wireless device and/or an authorized wireless device. The listing of wireless devices and associated access rights may identify a plurality of services associated with different media content, and access to the different media content may be restricted based, at least in part, on the associated access rights. In some examples, the listing of wireless devices and associated access rights may be transmitted to the same remote wireless device that transmitted the request to schedule media content for recording.

The request to schedule media content for recording may be received from a first wireless device, and the prohibited wireless device may comprise a second wireless device. In some examples, the first wireless device may be authorized to access, view, and/or receive the recorded media content by a default setting. Access to the recorded media content may be selectively provided to the second wireless device, and one or more other devices, on a per-device basis.

Figure 4:
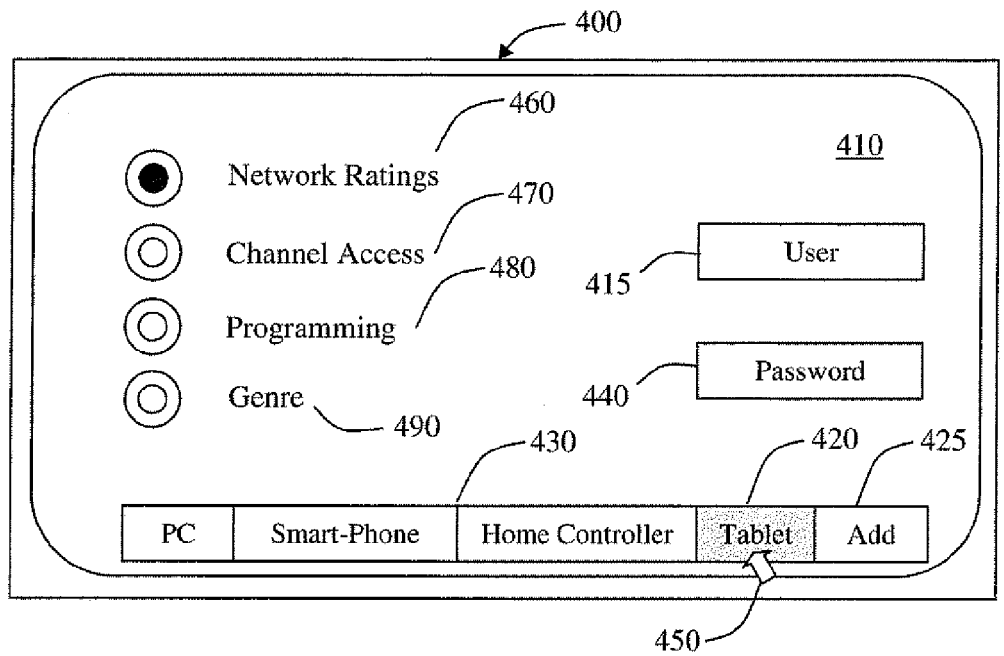
FIG. 4 depicts an example of a user interface for a system configured to control the delivery of media content to one or more remote devices.

FIG. 4 depicts an example of a user interface 400 for a system configured to control the delivery of media content to one or more remote devices. User interface 400 may be displayed by a display device 410 which may comprise a television, a monitor, a smart-phone, a plasma screen, a LCD screen, a projection screen, other types of display devices, or any combination thereof. One or more controllers may be configured to provide user control of display device 410, or to utilize display device 410 as a user interface of a media delivery system.

User interface 400 may be configured to display a plurality of icons 430, which may include user-selectable icons. Icons 430 may represent a plurality of electronic devices, including a television, a personal computer (PC), a smart-phone, a home controller, an audio system, a video system, a remote device, a wireless device, other types of electronic devices, or any combination thereof. Icons 430 may comprise a plurality of computer-generated graphical icons presented on user interface 400.

A pointing device 450 may be configured to select one or more of icons 430, and may be controlled by one or more controllers, such as controllers 180 (FIG. 1). Pointing device 450 may comprise a computer-generated graphical icon, or may be an optical pointing device, such as an LED or laser pointer. In some examples, display device 410 may be configured with optical receptors that detect light transmitted from pointing device 450 in order to identify a selected icon based on the position of the light on user interface 400.

Electronic devices may be added and/or removed from icons 430 by selecting an Add icon 425. Selection of Add icon 425 may allow a user to configure, via display device 410, a new device for receipt of recorded media. The new device may be associated with a new icon, an identifier, a name, a user, a login, access rights, device profile information, or any combination thereof. In some examples, user interface 400 may comprise a password 440 to authenticate that the user is authorized to manage and/or control the designation of recorded media content that may be delivered to the electronic device(s).

One or more users may be designated by a user field 415. User field 415 may be configured to associate the one or more users with a particular device, such as selected device 420. In some examples, user field 415 may be used in conjunction with password 440 to authenticate that the user is authorized to manage and/or control the designation of recorded media content that may be delivered to the electronic device(s).

A plurality of devices associated with icons 430 may be commonly assigned and/or registered to a particular user, such as a customer's child. In some examples, user interface 400 may be configured to universally prohibit and/or configure the plurality of devices for the particular user at the same time, such that all devices associated with the particular user may be similarly prohibited from accessing, viewing, and/or receiving a designated category and/or type of media content. In some examples, all the devices associated with the particular user may be associated with the same access rights.

Selection of one or more of icons 430 may cause user interface 400 to display user-selectable categories associated with the corresponding electronic device of the selected icon. A selected device 420, such as a tablet, may be associated with a listing of categories that may be configured to selectively authorize and/or prohibit the delivery of media to selected device 420. For example, selected device 420 may be associated with a network ratings category 460, a channel access category 470, a programming category 480, a genre category 490, other types of categories, or any combination thereof.

Media content associated with one or more of the categories 460, 470, 480, and 490 may comprise a television program, a recorded program, a video, a live feed, a digital image, animation, audio data, other types of electronic media, or any combination thereof. User interface 400 may be configured to detect movement of pointing device 450, for example, as a controller is manipulated by a user. A user selection of one or more of the categories 460, 470, 480, and 490 may cause another user interface to be displayed and/or cause user interface 400 to be revised with additional information and/or user-selectable options.

Figure 5:
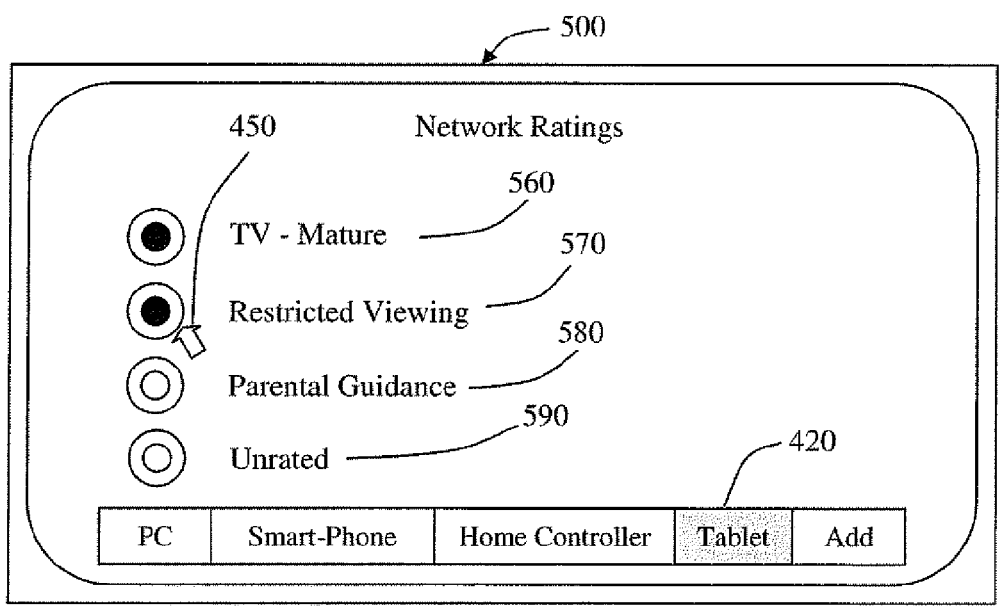
FIG. 5 depicts an example of a user interface for a system configured to control the delivery of media content according to a network rating.

FIG. 5 depicts an example of a user interface 500 for a system configured to control the delivery of media content according to a user selection of a designated rating category, such as the selection of network ratings category 460 of FIG. 4. A plurality of network ratings may be associated with selected device 420. The network ratings may be ordered according to the nature of the programming content, for example based on an age-based determination as to what content may be appropriate for a particular age of viewer. Pointer 450 may be configured to select one or more of the listed network ratings, including a first network rating 560, a second network rating 570, and a third network rating 580. In some examples, the selection of a particular network rating, such as second network rating 570, may cause one or more ratings located above the particular rating, such as first network rating 560, to be automatically selected.

In the example depicted by FIG. 5, selected device 420 may be prohibited from accessing, viewing, and/or receiving media associated with first network rating 560 and/or second network rating 570. On the other hand, selected device 420 may be authorized (implicitly or explicitly) to access, view, and/or receive media content associated with third network rating 580. A network rating category may also be associated with unrated media 590, for example media content which may not have been associated with any other rating category. In some examples, selected device 420 may be provided with authorization to access, view, and/or receive unrated media 590 by a system default setting. In other examples, selected device 420 may be prohibited from accessing, viewing, and/or receiving unrated media 590 by a system default setting.

Figure 6:
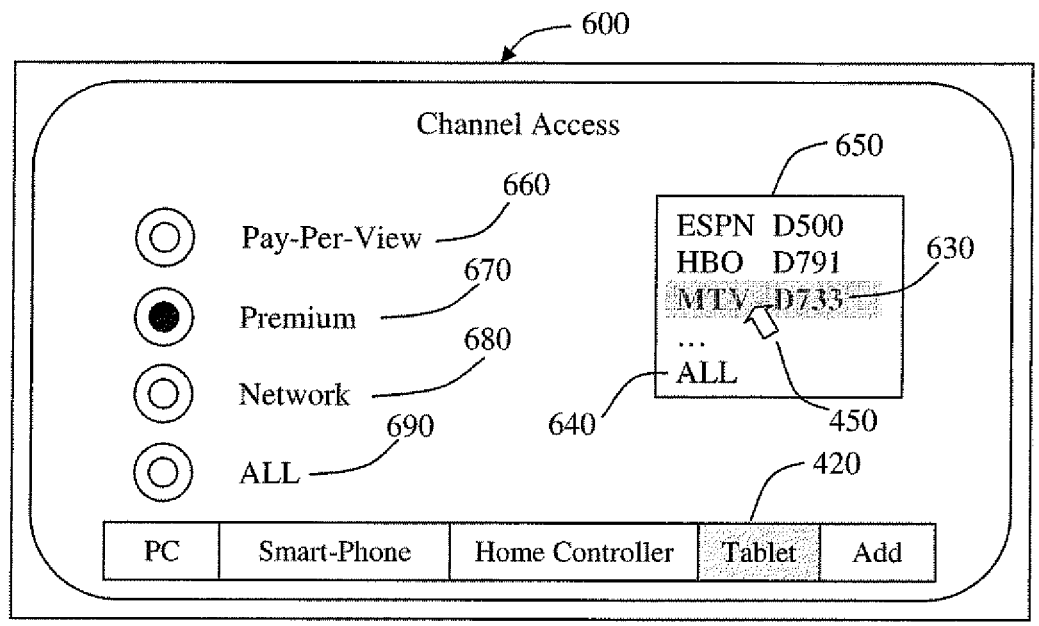
FIG. 6 depicts an example of a user interface for a system configured to control the delivery of media content according to a designated channel.

FIG. 6 depicts an example of a user interface 600 for a system configured to control the delivery of media content according to a user selection of a designated channel, such as the selection of channel access category 470 of FIG. 4. In some examples, selected device 420 may be associated with one or more prohibited channels, such that selected device 420 may be prohibited from accessing, viewing, and/or receiving media content associated with the one or more prohibited channels.

A listing of channels 650 may appear on user interface 600, from which a prohibited channel 630 may be selected, designated, and/or identified. In some examples, listing of channels 650 may correspond to a particular category of channels, such as pay-per-view channels 660, premium channels 670, network channels 680, other categories of channels, or any combination thereof. The categories of channels may facilitate locating and/or selecting prohibited channel 630 from a subset of, or smaller listing than, all the available channels in listing of channels 650. Additionally, a user-selectable option of ALL channels 690 may be made in order that all of the user-selectable channels may be made to appear in listing of channels 650.

In the example depicted by FIG. 6, listing of channels 650 may include channels associated with premium channels 670. Pointer 450 may be configured to select one or more of the listed channels, including prohibited channel 630. Prohibited channel 630 may be highlighted, emboldened, underlined, partially hidden, obscured, dimmed, asterisked, checkmarked, or otherwise identified as being a prohibited channel. In some examples, a user selection of ALL category channels 640 may be made to prohibit selected device 420 from accessing, viewing, and/or receiving all of the channels associated with the selected channel category, such as premium channels 670.

Figure 7:
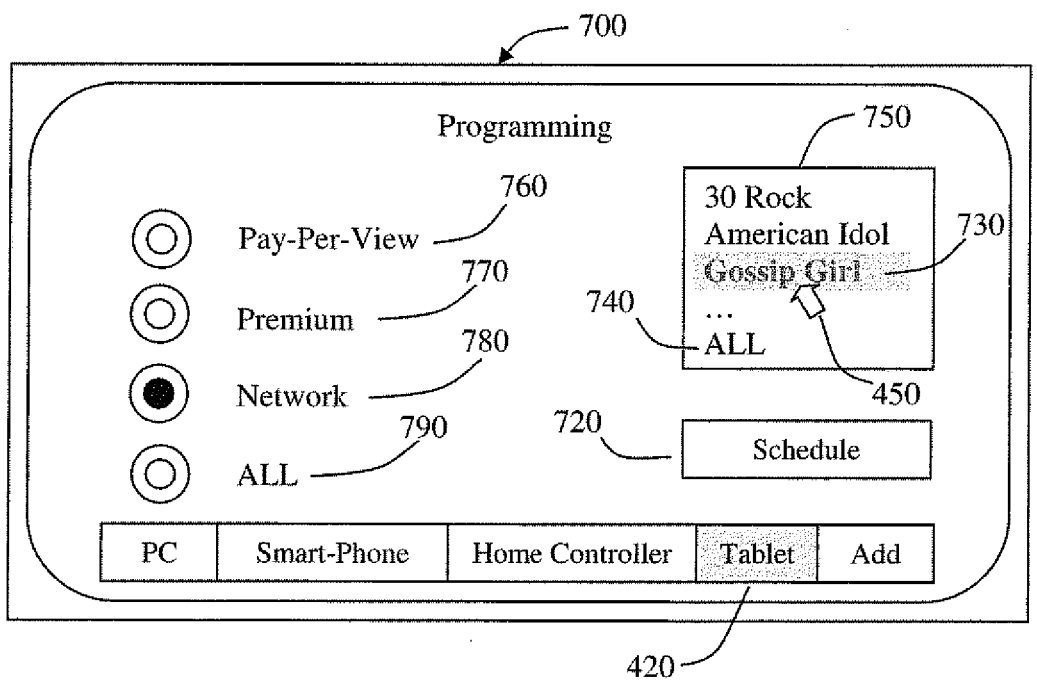
FIG. 7 depicts an example of a user interface for a system configured to control the delivery of media content according to a designated program.

FIG. 7 depicts an example of a user interface 700 for a system configured to control the delivery of media content according to a user selection of a designated program, such as the selection of programming category 480 of FIG. 4. In some examples, selected device 420 may be associated with one or more prohibited programs, such that selected device 420 may be prohibited from accessing, viewing, and/or receiving media content associated with the one or more prohibited programs.

A listing of programs 750 may appear on user interface 700, from which a prohibited program 730 may be selected, designated, and/or identified. In some examples, listing of programs 750 may correspond to a particular category of programs, such as pay-per-view programs 760, premium programs 770, network programs 780, other categories of programs, or any combination thereof. The categories of programs may facilitate locating and/or selecting prohibited program 730 from a subset of, or smaller listing than, all the available programs in listing of programs 750. Additionally, a user-selectable option of ALL programs 790 may be made in order that all of the user-selectable programs may be made to appear in listing of programs 750.

In the example depicted by FIG. 7, listing of programs 750 may include programs associated with network channels 780. Pointer 450 may be configured to select one or more of the listed programs, including prohibited program 730. Prohibited program 730 may be highlighted, emboldened, underlined, partially hidden, obscured, dimmed, asterisked, checkmarked, or otherwise identified as being a prohibited program. In some examples, a user selection of ALL category programs 740 may be made to prohibit selected device 420 from accessing, viewing, and/or receiving all of the programs associated with the selected program category.

Program 730 may be both scheduled for recording and associated with selected device 420 that is prohibited from viewing the program 730. A user may select program 730 from the listing of programs 750, schedule program 730 for recording using a scheduling tool 720, and also select device 420 that is, or will be, prohibited from accessing, viewing, and/or receiving program 730. Device 420 may be identified as being a prohibited device while scheduling program 730 for recording. The identification of prohibited device 420 and the scheduling of program 730 for recording may be performed using the same interface, such as user interface 700, or may be performed using different user interfaces.

Figure 8:
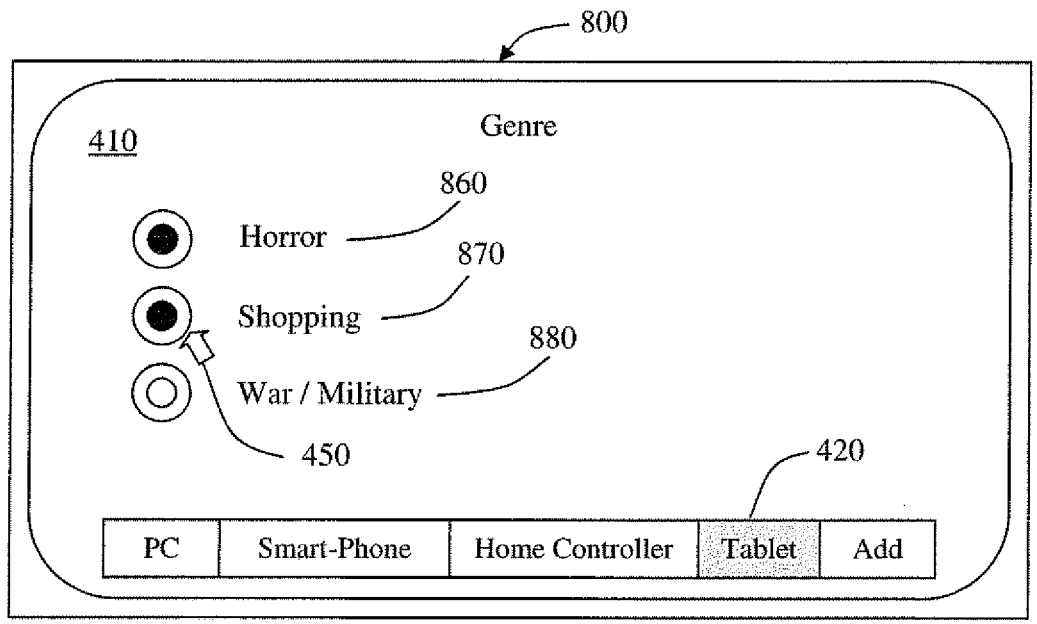
FIG. 8 depicts an example of a user interface for a system configured to control the delivery of media content according to a designated programming genre.

FIG. 8 depicts an example of a user interface 800 for a system configured to control the delivery of media content according to a user selection of a designated programming genre, such as the selection of genre category 490 of FIG. 4. In some examples, selected device 420 may be associated with one or more prohibited genres of programming, such that selected device 420 may be prohibited from accessing, viewing, and/or receiving media content associated with the one or more prohibited genres of programming.

A listing of program genres may appear on user interface 800, from which a prohibited genre may be selected, designated, and/or identified. In the example depicted by FIG. 8, the listing of program genres may include programs associated with a honor genre 860, a shopping genre 870, a war/military genre 880, other genres, or any combination thereof. Pointer 450 may be configured to select, designate, and/or identify one or more of the listed genres as being prohibited genres.

Figure 9:
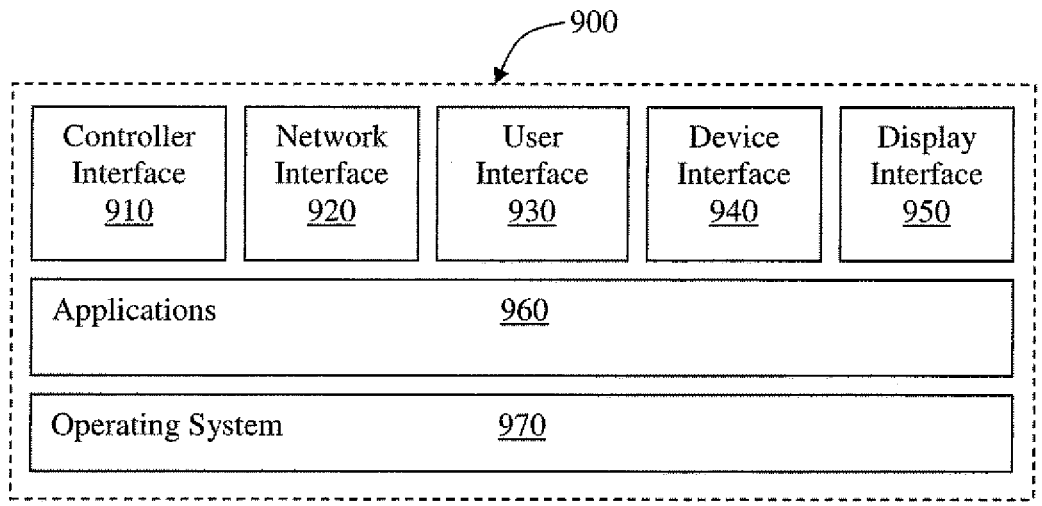
FIG. 9 depicts a block diagram of an example of a system comprising operational modules configured to control the delivery of media content to a remote device.

FIG. 9 depicts a block diagram of an example of a system 900 comprising operational modules configured to control the delivery of media content to a remote device. In some examples, operational modules 900 may comprise software modules. Operation modules 900 may be configured for operation with a media delivery system. Operation modules 900 may comprise a controller interface 910, a network interface 920, a user interface 930, a device interface 940, a display interface 950, applications 960, and an operating system 970.

Controller interface 910 may be configured to interact with one or more controllers, such as controller 180 of FIG. 1. Network interface 920 may be configured to manage interfaces with one or more networks, such as network 190 of FIG. 1. User interface 930 may be configured to control the features of a media delivery system.

Device interface 940 may be configured to communicate with one or more devices depicted in FIG. 1, such as wireless device 140, media recording device 130, streaming media device 170, television 150, personal computer 120, or any combination thereof. Display interface 950 may be configured to present information to a display device. Applications 960 may include instructions for, or be configured to, process media, provide media delivery options, manage devices and networks, perform other functions, or any combination thereof. In some examples, applications 960 may comprise a computer access protocol to manage the delivery of media content to one or more electronic devices. Additionally, applications 960 may be configured to schedule the recording of media content.

Figure 10:
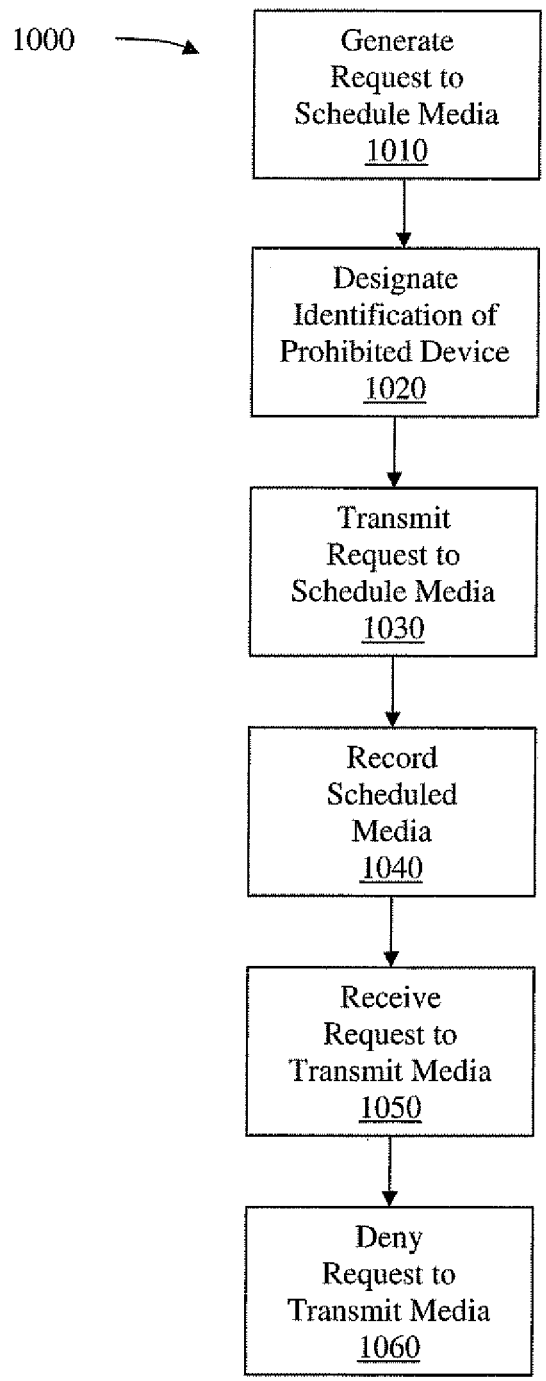
FIG. 10 depicts an example of a process for controlling the delivery of media content to a remote device.

FIG. 10 depicts an example of a process 1000 for controlling the delivery of media content to a remote device. At operation 1010, a request to schedule media content for recording may be generated.

At operation 1020, an identification of a wireless device that may be prohibited from accessing the scheduled media content may be designated. The identification of the wireless device may be made from, and/or identified in, a listing of wireless devices. The listing of wireless devices may identify a plurality of services associated with different media content. A plurality of services the wireless device may be prohibited from accessing may be identified in the listing of wireless devices.

The identification of the prohibited wireless devices may be designated prior to generating the request to schedule the media content. In some examples, the identification of the prohibited wireless devices may be designated while generating the request to schedule the media content.

The identification of the prohibited device may be identified by assigning a viewing permission setting to a selected program of the scheduled media content, and by restricting access of the prohibited wireless device to the selected program based, at least in part, on the assigned viewing permission setting. In some examples, the identification of the prohibited device may be identified by assigning a parental control setting to a selected channel of the scheduled media content, and by restricting access of the prohibited wireless device to the selected channel based, at least in part, on the assigned parental control setting.

The listing of wireless devices may be received from another device prior to making the identification. In some examples, the listing of wireless devices may identify one or more wireless devices that are authorized to access the scheduled media content.

At operation 1030, the request to schedule media content may be transmitted. The request to schedule media content may comprise a parental control setting associated with the scheduled media content. An identified wireless device may be prohibited from accessing the scheduled media content associated with the parental control setting At operation 1040, the scheduled media content may be recorded. The scheduled media content may be recorded on a memory device for later transmission to a wireless device that is authorized to access, view, and/or receive the recorded media content.

At operation 1050, a request to transmit the media content to the prohibited wireless device may be received. The request may be received after the media content is recorded.

At operation 1060, the request to transmit the recorded media content to the prohibited wireless device may be denied in response to receiving the request to transmit. In some examples, the wireless device may be designated as being prohibited from accessing, viewing and/or receiving the recorded media content prior to the scheduled media content being recorded.

The exemplary process 1000 depicted by FIG. 10, and the associated operations described therein, may be performed by one or more processing devices, apparatus, and/or systems depicted by any of the figures in, or otherwise disclosed by, this specification.

Figure 11:
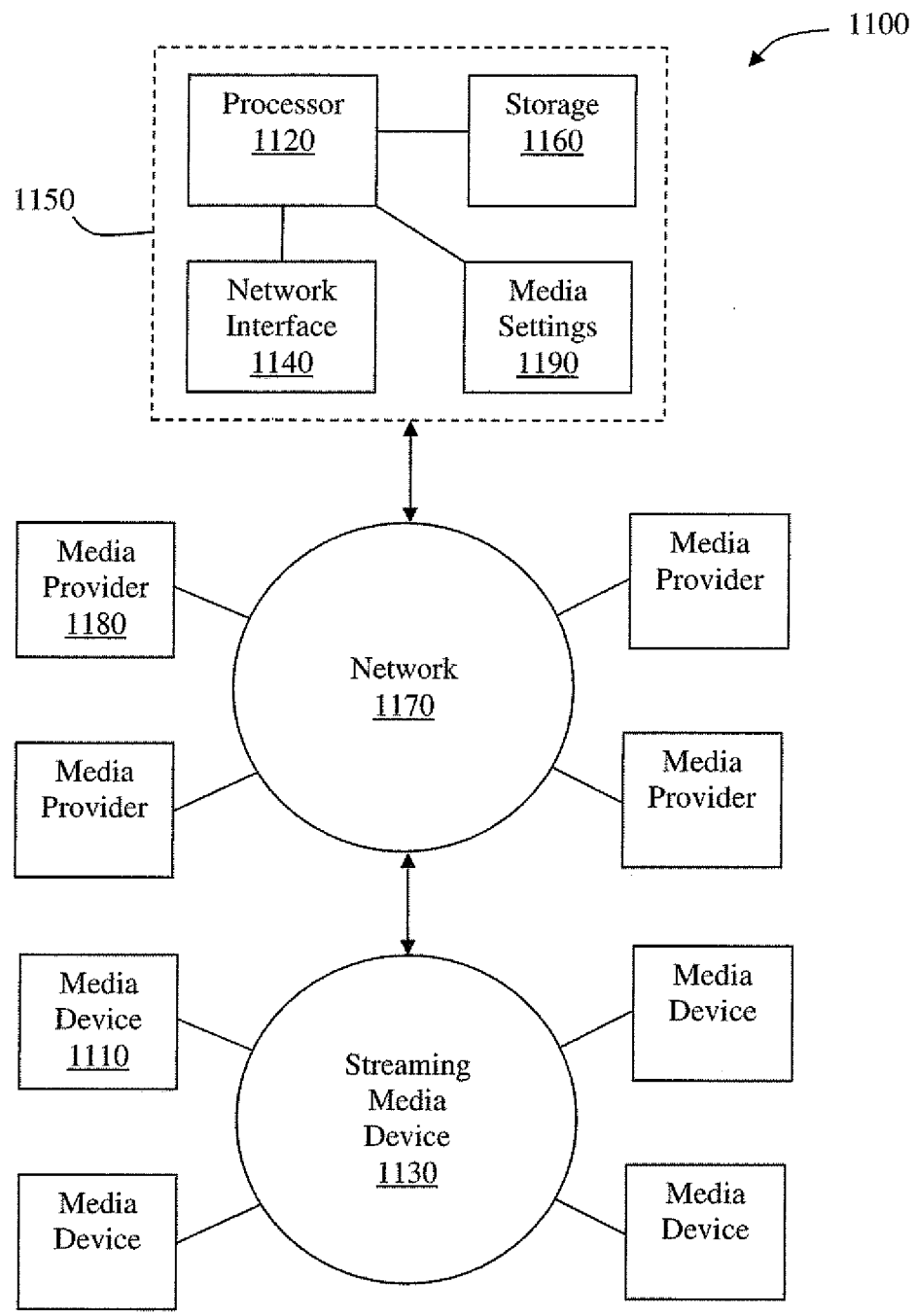
FIG. 11 depicts a block diagram of an example of a system configured to deliver media content to a streaming media device.

FIG. 11 depicts a block diagram of an example of a system 1100 configured to deliver media content to a streaming media device 1130. In some examples, system 1100 may be configured to control access to, and/or to control delivery of, the media content over a network 1170. The media content may be provided by one or more media content providers, such as media provider 1180. System 1100 may comprise a processing device 1120, a network interface 1140, a storage device 1160, and media delivery settings 1190. In some examples, system 1100 may be associated with a service provider 1150. Service provider 1150 may comprise a cable network media provider, a dish network media provider, a Wi-Fi network media provider, a cellular network media provider, a broadband media service provider, other types of media content providers, or any combination thereof.

System 1100 may comprise a processing device 1120 configured to perform some or all of the operations, processes, and/or methods as depicted by FIGS. 1-10 or otherwise disclosed in the present specification. System 1100 may comprise one or more storage devices 1160 configured to save media content. In some examples, the media content may be stored by service provider 1150 as part of a cloud based storage service. A customer associated with streaming media device 1130, and/or associated with a media device 1110, may subscribe to one or more services provided by service provider 1150.

Network interface 1140 may be configured to facilitate the transmission of media content and other types of information transmitted to/from streaming media device 1130, such as a request for recorded media, a designation of a prohibited device, a listing of prohibited devices, access rights associated with a prohibited device, other types of information, or any combination thereof.

Streaming media device 1130 may be operatively coupled to one or more media devices, such as media device 1110. Media device 1110 may be configured to receive streaming media from streaming media device 1130 and to play back the streamed media content. The streamed media content may be stored in storage device 1160 and may be streamed to media device 1110 as it is being transmitted from service provider 1150 to streaming media device 1130. Media delivery settings 1190 may comprise device management settings, similar to device management settings 160 depicted in FIG. 1. For example, media delivery settings 1190 may include a listing of devices, such as media device 1110, and associated media access rights. Additionally, media delivery settings 1190 may comprise content delivery control settings, similar to content delivery control settings 197 depicted in FIG. 1. For example, media delivery settings 1190 may comprise parental control settings configured to restrict media content being provided by one or more media content providers, such as media provider 1180.

The systems, devices, and apparatus described above may use dedicated processor systems, micro controllers, programmable logic devices, microprocessors, or any combination thereof, to perform some or all of the operations described herein. Some of the operations described above may be implemented in software and other operations may be implemented in hardware. One or more of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. We claim all modifications and variation coming within the spirit and scope of the following claims.

The invention claimed is:

1. A memory device having instructions stored thereon that, in response to execution by a processing device, cause the processing device to perform operations comprising:
   receiving a request to schedule media content for recording, wherein the request to schedule media content identifies a scheduled time for recording the media content and identifies media content access rights associated with a wireless device;
   updating a list with the media content access rights of the wireless device;
   recording the scheduled media content received from a streaming device during the scheduled time based, at least in part, on the request;
   receiving a request to transmit the media content to the wireless device; and
   denying the request to transmit the media content to the wireless device based, at least in part, on the media content access rights of the wireless device.

2. The memory device of claim 1, wherein the request to schedule media content further identifies media access rights associated with an authorized wireless device that authorizes access to the media content.

3. The memory device of claim 2, wherein the operations further comprise:
   receiving a second request to transmit the media content to the authorized wireless device; and
   transmitting the media content to the authorized wireless device in response to receiving the second request to transmit.

4. The memory device of claim 2, wherein the authorized wireless device is identified before the scheduled media content is recorded.

5. The memory device of claim 1,
   wherein the list identifies a plurality of services associated with different media content; and
   wherein access to the different media content is restricted based, at least in part, on the associated access rights.

6. The memory device of claim 5, wherein the operations further comprise transmitting the list to a remote wireless device that transmitted the request to schedule media content for recording.

7. The memory device of claim 1,
   wherein the request to schedule media content for recording is received from a first wireless device; and
   wherein the wireless device comprises a second wireless device different from the first wireless device.

8. The memory device of claim 7, wherein the first wireless device is authorized to access the media content.

9. The memory device of claim 1, wherein the operations further comprise selectively providing access to the media content on a per device basis.

10. A method, comprising:
    receiving, by a processing device, a request to schedule media content for recording, wherein the request to schedule media content identifies a scheduled time for recording the media content and identifies media content access rights associated with a wireless device wirelessly coupled to the processing device;
    updating, by the processing device, a list with the media content access rights of the wireless device;
    recording, by the processing device on a memory device, the media content received from a streaming device during the scheduled time based, at least in part on, the request;
    receiving, by the processing device from the wireless device, a request to transmit the media content recorded on the memory device; and
    denying, by the processing device, the request to transmit the media content recorded into the memory device to the wireless device based at least in part on the media content access rights of the wireless device.

11. The method of claim 10, wherein the request to schedule media content further identifies media access rights associated with an authorized wireless device that authorizes access to the media content.

12. The method of claim 11, further comprising:
    receiving, by the processing device, a second request to transmit the media content recorded on the memory device to the another wireless device; and
    transmitting, by the processing device, the recorded media content to the another wireless device in response to receiving the second request to transmit.

13. The method of claim 11, wherein the another wireless device is identified before the scheduled media content is recorded on the memory device.

14. The method of claim 10, further comprising:
    identifying, from the list, a plurality of services associated with different media content; and
    restricting access to the different media content based, at least in part, on the access rights.

15. The method of claim 14, further comprising transmitting the list to a remote wireless device that transmitted the request to schedule media content for recording.

16. The method of claim 10,
wherein the request to schedule media content for recording is received by the processing device from a first wireless device; and
wherein the wireless device comprises a second wireless device different from the first wireless device.

17. The method of claim 16, wherein the first wireless device is authorized to access the media content recorded on the memory device.

18. The method of claim 10, further comprising selectively providing access to the media content recorded on the memory device on a per device basis.

19. An apparatus, comprising:
first means for receiving a request to schedule media content for recording, wherein the request to schedule media content identifies a scheduled time for recording the media content and identifies media content access rights associated with a wireless device wirelessly coupled to the apparatus;
means for updating a list with the media content access rights of the wireless device;
means for recording on a memory device, the media content received from a streaming device during the scheduled time based, at least in part, on the request;
second means for receiving a request to transmit the media content recorded on the memory device from the wireless device; and
means for denying the request to transmit the media content recorded on the memory device to the wireless device based at least in part on the media content access rights of the wireless device.

20. The apparatus of claim 19, wherein the request to schedule media content further identifies media access rights associated with an authorized wireless device that authorizes access to the media content.

21. The apparatus of claim 20, wherein said first means for receiving comprises means for receiving a second request to transmit the media content recorded on the memory device to the authorized wireless device, and wherein said means for transmitting comprising means for transmitting the media content recorded on the memory device to the authorized wireless device in response to receiving the second request to transmit.

22. The apparatus of claim 20, wherein the authorized wireless device is identified before the scheduled media content is recorded.

23. The apparatus of claim 19,
wherein the list identifies a plurality of services associated with different media content; and
wherein access to the different media content is restricted based, at least in part, on the access rights.

24. The apparatus of claim 23, further comprising means for transmitting the list to a remote wireless device that transmitted the request to schedule media content for recording.

25. The apparatus of claim 19,
wherein the request to schedule media content for recording is received from a first wireless device; and
wherein the wireless device comprises a second wireless device different from the first wireless device.

26. The apparatus of claim 19,
wherein the request to schedule media content further identifies a particular user that is prohibited from accessing the media content recorded on the memory device while using the wireless device; and
wherein a plurality of users are associated with the wireless device.

* * * * *